(No Model.) 2 Sheets—Sheet 1.
K. KNOTT.
Refrigerating Apparatus.
No. 236,339. Patented Jan. 4, 1881.
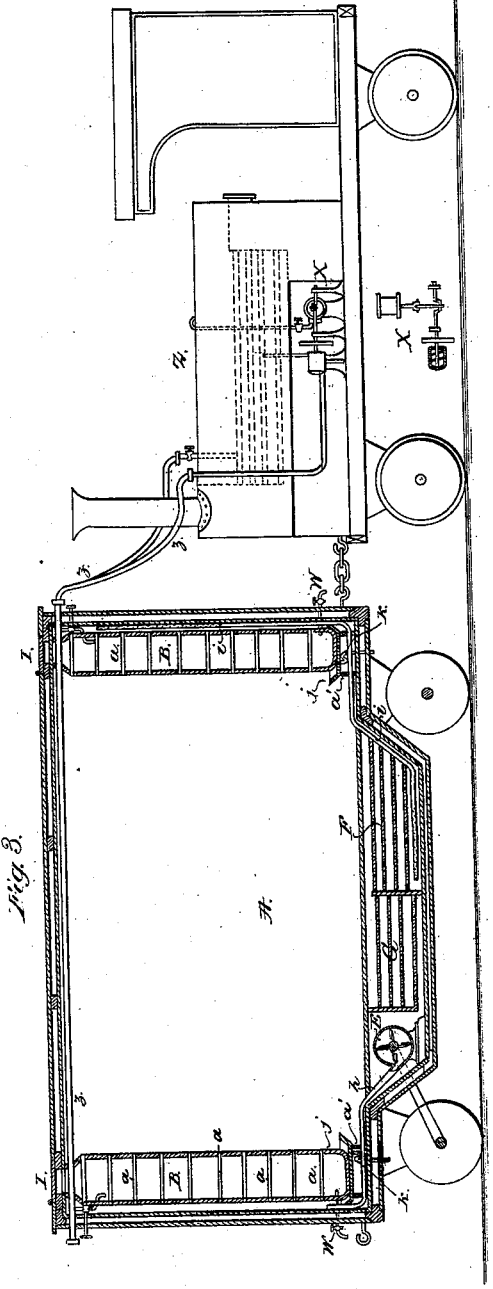
WITNESSES:
INVENTOR:
Kennard Knott
BY
ATTORNEYS.

(No Model.) 2 Sheets—Sheet 2.
K. KNOTT.
Refrigerating Apparatus.
No. 236,339. Patented Jan. 4, 1881.
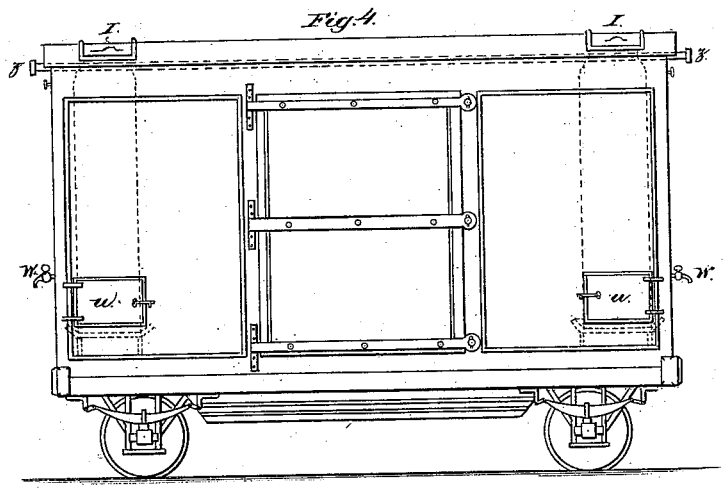
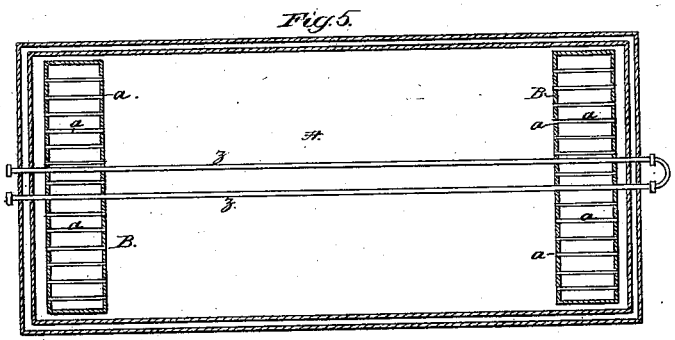
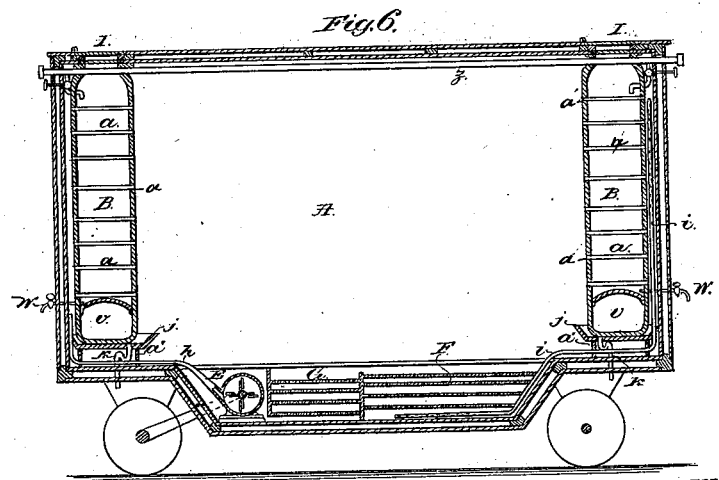
WITNESSES:
INVENTOR:
Kennard Knott
BY
ATTORNEYS.

UNITED STATES PATENT OFFICE.

KENNARD KNOTT, OF LONDON, ENGLAND.

REFRIGERATING APPARATUS.

SPECIFICATION forming part of Letters Patent No. 236,339, dated January 4, 1881.

Application filed April 16, 1880. (No model.) Patented in England May 12, 1879.

*To all whom it may concern:*

Be it known that I, KENNARD KNOTT, of St. George Yard, Lombard Street, London, England, have invented new and useful Improvements in Apparatus for Preserving Substances in all Climates during Transportation or otherwise; and I do hereby declare that the following is a full, clear, and exact description of the same.

The object of the improvements is to obtain and maintain in a simple, cheap, and effective manner the temperature required for the preservation of meats, fish, poultry, game, and other perishable substances during transportation or when stored, and whether in hot or cold climates; also for cooling wort in breweries for distilling purposes, and also for cooling buildings of all kinds, and to effect a circulation of air (whether cooled or heated, as the case may be) in an air-tight, or nearly air-tight, chamber, and also to condense and absorb any dampness in such air and to purify it.

In carrying out my invention I employ an air-tight, or nearly air-tight, and non-conducting preserving-chamber, and I provide an arrangement, hereinafter described, whereby a constant circulation of the cooled or heated, dried, and purified air is kept up in the said chamber.

To make my invention better understood, I will proceed to describe the same by reference to the accompanying drawings, in which—

Figure 1 is a sectional elevation of a stationary apparatus constructed according to my invention. Fig. 2 is a transverse section of the tubular tank I prefer to employ in such stationary apparatus. Fig. 3 is a section of a car constructed according to my invention, and also of a boiler connected therewith. Fig. 4 is a side view of a car. Fig. 5 is a horizontal section of a car of modified construction. Fig. 6 is a vertical section of the same.

I will first describe the stationary apparatus shown in Figs. 1, 2 as used for producing any required low temperature.

A A is the provision-chamber, rendered non-conducting and air-tight in any suitable manner, and provided with the usual air-tight-closing doors.

B B is a tubular tank, standing in a pan or tray, $j$, for receiving the condensed moisture dropping from the said tank. The tank is supported on a table or scantling and provided with tubular air-passages $a\ a$, passing through it horizontally, or preferably in a slightly-oblique direction. I prefer to make the tank with inclined sides, (although it is not so shown in the drawings,) so as to allow the moisture condensed thereon to more easily drain into the collecting pan or tray in which it is placed.

In the tank shown in Fig. 1, and particularly in Fig. 2, is a coil, $b$, (or a number of passages forming a coil or its equivalent.) This coil $b$ is connected to any suitable ice-making or refrigerating machine, C, by the delivery-pipe $c$ and return-pipe $d$.

D is an air-tight non-conducting chamber, in which is fitted a fan or blower, E, and it also has a chamber, F, provided with shelves or trays $e$, covered or filled with charcoal, and a chamber, G, provided with shelves or trays $f$, carrying any suitable absorbent of moisture, such as chloride of calcium. This chamber G is connected by means of the pipe $g$ with the blower E.

$h$ is a delivery-pipe extending from the blower into the chamber A.

$i$ is a collecting-pipe, perforated at one end, the other end opening into the purifying-chamber F.

$k$ is a siphon-pipe, through which water collected in the pan or tray $f$ is discharged outside the chamber. A pipe having a cock will be in practice provided, through which the exhausted cooling (or heating) agents from the tank may be discharged outside the chamber.

The action of this apparatus when used as a refrigerator is as follows: The tubular tank B is charged or filled with a solution of glycerine or brine, or other uncongealable liquid. The freezing agent from the refrigerating-machine C is forced through the coil $b$, and will reduce the glycerine or other solution in the tubular tank B to a very low temperature, and the air in the chamber A, passing around and over the tank B and through the air-passages $a$ therein, will also be reduced to a very low temperature, the degree of which may be regulated by the ice-machine C. Any dampness in the air condensed on the tank B will be collected in the pan or tray $j$, and will be discharged outside the chamber through the siphon-pipe $k$, as hereinbefore described.

To effect a circulation of the cooled air in the chamber A the fan or blower E is set in motion, and the air will be thereby drawn into the purifying-chamber F through the collecting-pipe $i$, and will pass over the charcoal on the shelves or trays $e$, as shown by the arrows, by which means the air will be purified. The air will then pass into the chamber G, and any dampness which it may contain will be absorbed by the chloride of calcium or other absorbing agent on the shelves or trays $f$, over which it passes, as shown by the arrows. The air thus purified and dried will then pass into the blower through the pipe $g$, and will be forced into the chamber A through the delivery-pipe $h$ behind the tank B, and will become cooled by passing around and over the tank and through the air-passages $a$ $a$ therein, and will be again distributed through the chamber. By this arrangement it will thus be seen that a constant circulation of the same cooled, dried, and purified air will be kept up in the chamber A, and the articles stored therein will be kept sweet and fresh for any desired length of time and at a comparatively small cost.

Suitable means will in practice be provided for charging and emptying the tank B and the chambers F and G.

I would here remark that, although I have shown the tank placed in the end of the refrigerating-chamber, it will be understood that it may be placed in any other suitable position, as also may the purifying and absorbing chambers, the blower, and the refrigerating-machine, particularly on board ships, where economy of space is a special object; but in any case the various pipes connecting them to the chamber must be rendered air-tight and non-heat-conducting. I can also employ a refrigerating-machine, fan, or blower and purifying and absorbing chambers in this manner with that class of refrigerators which are cooled by means of a tank and pump connected with pipes coiling round a provision-chamber, or in a chamber cooled in any other manner. In this case the air in the provision-chamber is cooled by coming in contact with the pipe coiling round the provision-chamber, instead of by contact with the hereinbefore-described tank, which in this arrangement would not be required.

For cooling wort in breweries, for distillery uses, and for cooling buildings, I drive cold air through a non-conducting main pipe running through the building, which forms the main branch pipe to the place or places required to be cooled, and returning it to the cold-producing chamber by a return-main, to be again cooled. For houses and buildings, from the main pipe pass branch supply-pipes for supplying cold air to the required place or rooms to be cooled, the supply being turned on or off by means of suitable cocks. The air required over that which returns to the refrigerating-room through the main by a safety-valve is supplied from the atmosphere by any suitable means, such as a pressure-valve.

When the apparatus shown in Fig. 1 is employed in cold climates or during very cold weather, the refrigerating-machine is not employed; but in lieu thereof I employ any suitable boiler or water-heating apparatus, from which a certain quantity of hot water may, as required, be supplied to the tank B, (which in this case contains no glycerine or other solution,) and the action is substantially the same as that hereinbefore described, except that, instead of a circulation of cold air, I obtain a circulation of the same warmed, dried, and purified—that is to say, air warmed to the desired temperature, either above or below freezing—whereby, no matter what be the external temperature, the article stored in the chamber will be maintained at the required temperature and be prevented from becoming frozen, and will be kept sweet and fresh for any desired length of time and at a comparatively small cost.

In Figs. 3, 4, 5, and 6, which show views of railway-cars constructed according to my invention, the arrangement is substantially the same as that of the stationary apparatus shown in Fig. 1, except that the required temperature may be produced in the tanks B B by means of agents, such as fine ice, or ice and salt when cold is required. I also provide the means for heating or warming the cars in cold weather, as will be hereinafter described.

The car A is made air-tight and non-conducting and provided with air-tight-closing doors. E is the fan or blower, driven from one of the axles of the car; F, the purifying-chamber; $h$, delivery-pipe; $i$, perforated collecting-pipe. $j$ $j$ are the pans or trays on which the tanks B B are placed; $k$ $k$, siphon-pipes for discharging the condensed moisture outside the car; $w$ $w$, discharge-pipes for the tanks.

The action of the car when in motion and for cooling is substantially the same as that described for the stationary apparatus, and therefore needs no further description.

The tanks are charged through the air-tight-closing doors 1 1 at the top of the car; and suitable means are provided for charging and emptying the chambers F and G and for oiling the blower E.

I will now describe the arrangement for raising and maintaining the temperature of the cars to the required degree when running in very cold climates, or when the temperature is below the freezing-point.

To each train of cars is coupled a suitable furnace and boiler, Z, Fig. 3, mounted on wheels, so as to run with the train, and provided with a platform and caboose for the attendant. Along the top of each car pass two non-heat-conducting pipes, $z$ $z$, with means for coupling together the pipes between one car and the next, as shown, the two pipes at the end of the last carriage being connected together, the other ends of the said pipes being connected one with the boiler and the other with any suitable pump, *x*, connected with the boiler. The said pump may be driven from one end of the axles of the carriage of the boiler, or otherwise, and when in motion will cause a circulation of hot water from the boiler and through the said pipes *z z*. The outlet-pipe from the pump *x* is provided with stop-cocks, one for each tank B, so that any required quantity of hot water from the boiler may be supplied to the tanks, each tank being also provided with a cock, *w*, to allow of the water being discharged when it becomes cooled and a fresh supply of water is required. The action will be the same as that hereinbefore described, the car being heated instead of cooled.

In cases where it may be desired to employ only a single car, and not a train of cars, I do not employ a boiler for supplying hot water, but at the lower part of each end of the car is formed, as shown at the car marked No. 1, Figs. 3, 4, and 6, an air-tight metal chamber, *v*, just underneath the bottom of the tank B, with a door, *u*, at each end and both sides of the car, Fig. 4, and in these air-tight chambers I place a number of oil-lamps for producing the required amount of heat in the car. The doors of the chambers are provided with any suitable arrangement for the admission of the air required for the combustion of the lamps, and the products of combustion are conveyed outside the car by any suitable flue. The action of this arrangement will be understood without further description.

Having thus described the nature of my invention, and the preferred means for carrying the same into effect, I wish it to be understood that I do not confine myself to the precise details herein laid down and shown in the drawings, as the same may be varied without departing from the peculiar character of my invention; but

What I do claim is—

1. The combination of the following elements: an air-tight non-heat-conducting chamber, a tank placed therein, an apparatus connected with the latter by means of pipes for supplying fluid to the same, an air-tight chamber containing purifying and absorbing agents, and a fan-blower or pump having distributing and collecting pipes, all said parts being arranged substantially as shown and described, to operate as specified.

2. The pipe *i*, tank B, having passages *a* and coiled pipe *b*, the refrigerating-machine C, pipes *c d*, and purifying and absorbing chambers F G, and blower E, all as shown and described, for the purposes specified.

KENNARD KNOTT.

Witnesses:
G. G. S. MACPHERSON,
8 *George Yard, Lombard Street, London, Merchant.*
J. EDW. BEESLEY,
2 *Pope's Head Alley, Cornhill, London, Gentleman.*